Inventor
Lucien J. Plouffe

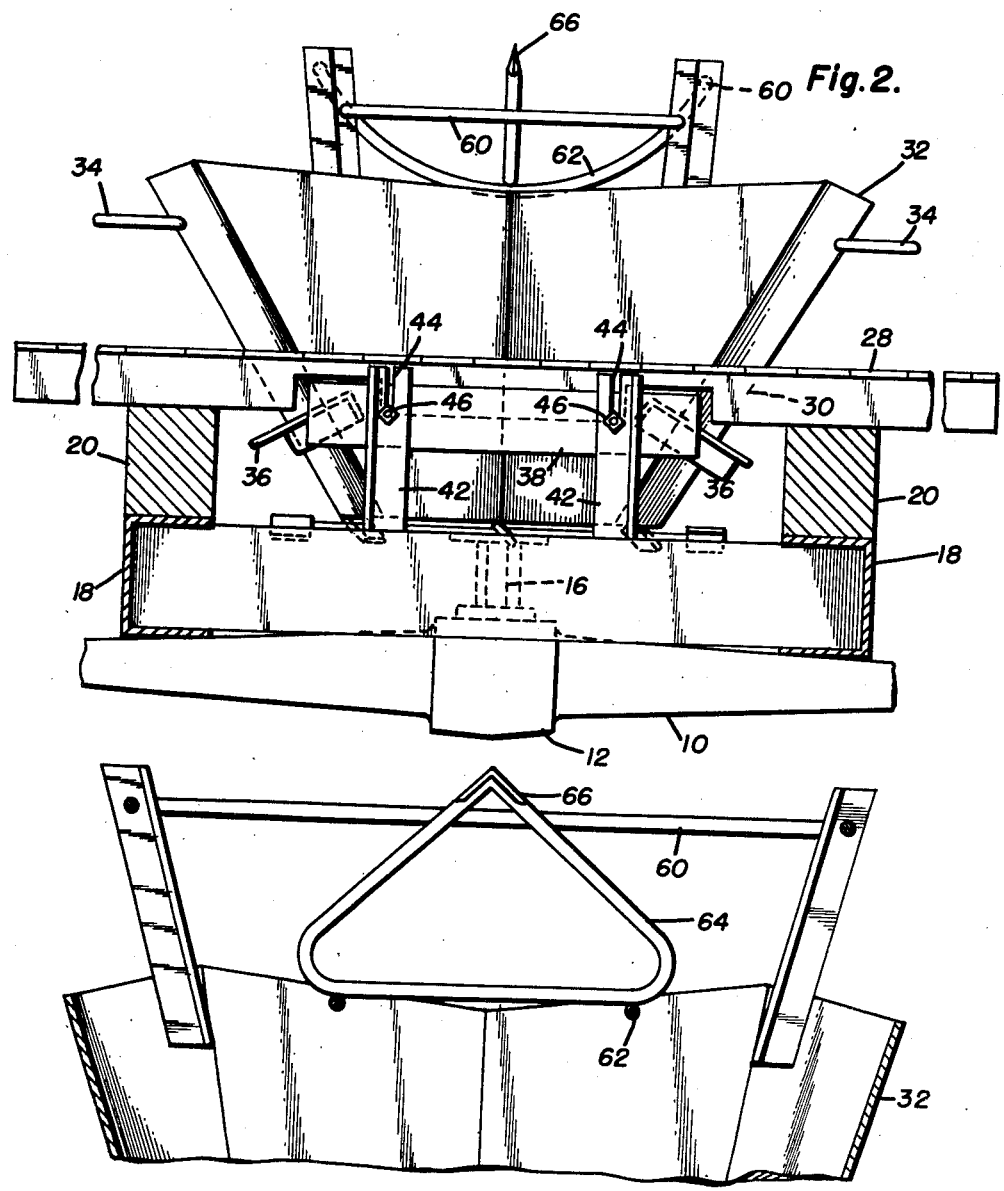

July 17, 1951  L. J. PLOUFFE  2,560,981
TRAILER LIME SPREADER
Filed Dec. 2, 1946 5 Sheets-Sheet 3

Inventor
Lucien J. Plouffe
By *Clarence A. O'Brien and Harvey B. Jacobson*
Attorneys July 17, 1951

L. J. PLOUFFE 2,560,981

TRAILER LIME SPREADER

Filed Dec. 2, 1946

Inventor
Lucien J. Plouffe

By *Clarence A. O'Brien and Harvey B. Jacobson*
Attorneys

Inventor
Lucien J. Plouffe

Patented July 17, 1951

2,560,981

UNITED STATES PATENT OFFICE 2,560,981

TRAILER LIME SPREADER

Lucien J. Plouffe, Cornwall, Vt.

Application December 2, 1946, Serial No. 713,584

5 Claims. (Cl. 275—8)

This invention relates to a soil and vegetation conditioning apparatus adapted for use in various farming operations.

An object of this invention is to provide means for ejecting a fertilizer over a predetermined area.

Another object of this invention is to provide means for ejecting fertilizer over a predetermined area, said conditioner being ejected in a predetermined condition relative to the density thereof.

Another object of this invention is to provide means for adjusting the amount of fertilizer ejected.

A further object of this invention is to provide means for urging lime or fertilizer material out of the hopper.

A still further object of this invention is to provide means for scattering the fertilizer after it has been ejected from the hopper.

A still further object of this invention is to provide means for fracturing lumps of lime or other conditioner prior to ejection thereof.

A further object of this invention is to provide means for rupturing soil conditioner or fertilizer bags upon loading of the hopper.

Another object of this invention is to provide a device of the character described which is readily convertible from a trailer to a fertilizer ejecting implement.

Further objects and features of novelty will become readily apparent to those skilled in the art, in following the description of a preferred embodiment of the instant inventive concept, with reference to the accompanying drawings, wherein:

Figure 2 is a transverse sectional view of the present invention taken substantially on the line 2—2 of Figure 1 and in the direction of the arrows;

Figure 5 is an enlarged fragmentary sectional view showing the rupturing means for the fertilizer bags which forms part of the instant invention;

Figure 1:
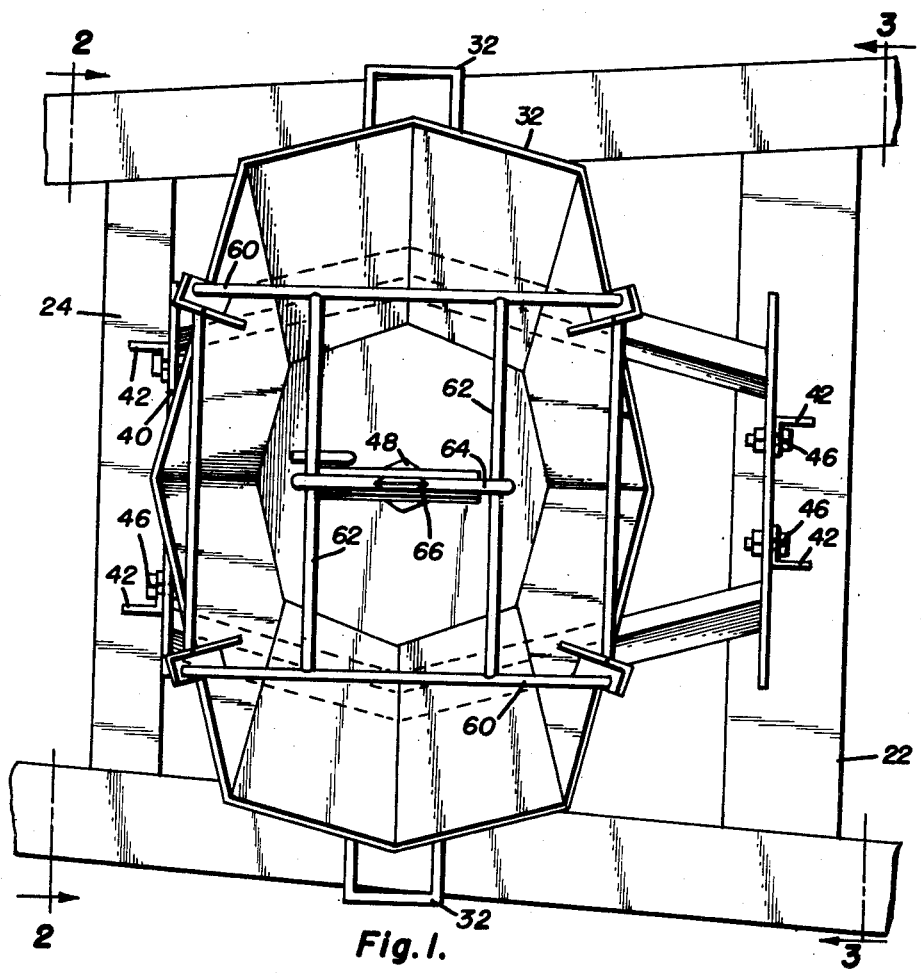
Figure 1 is a plan view of the present invention with the disc or rotator unshown.
Figure 8:
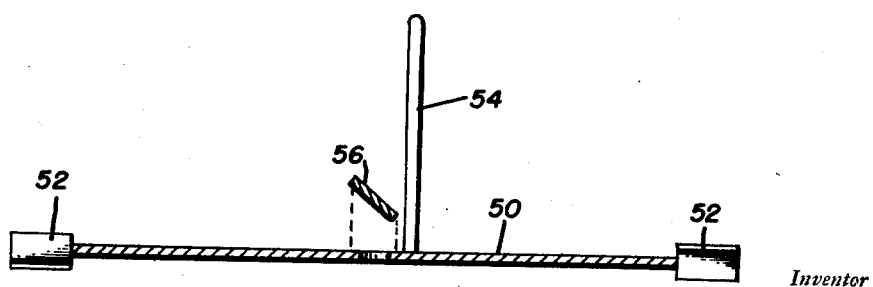
Figure 8 is a detail similar to that shown in Figure 7, the hopper being removed.
Figure 3:
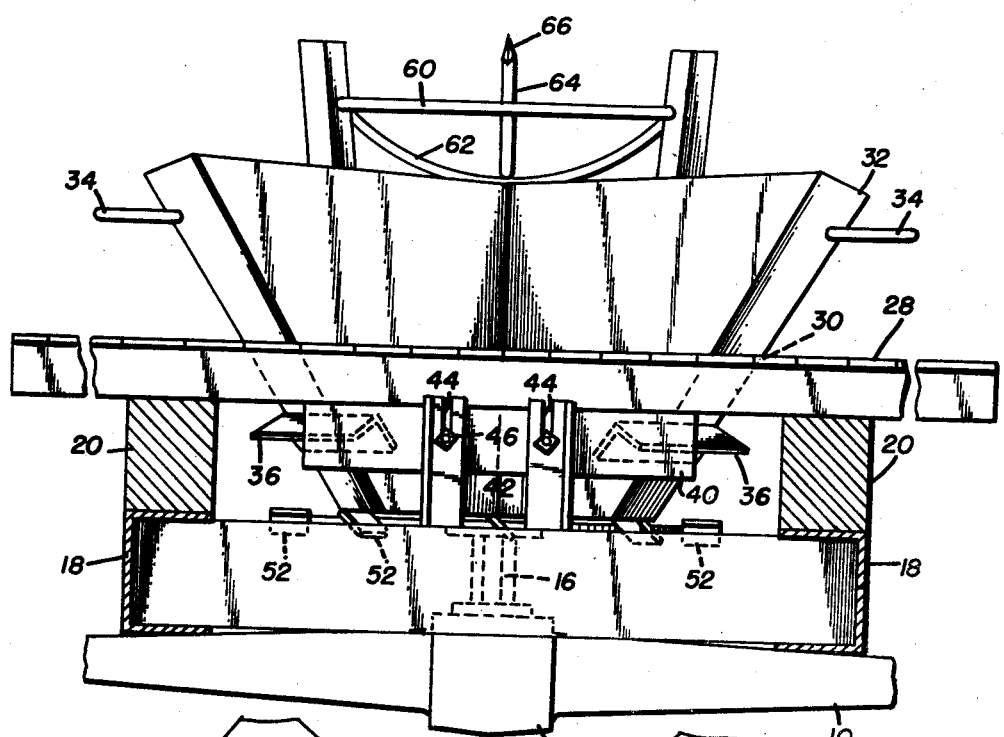
Figure 3 is a transverse sectional view of the invention taken substantially on the line 3—3 of Figure 1 and in the direction of the arrows.
Figure 9:
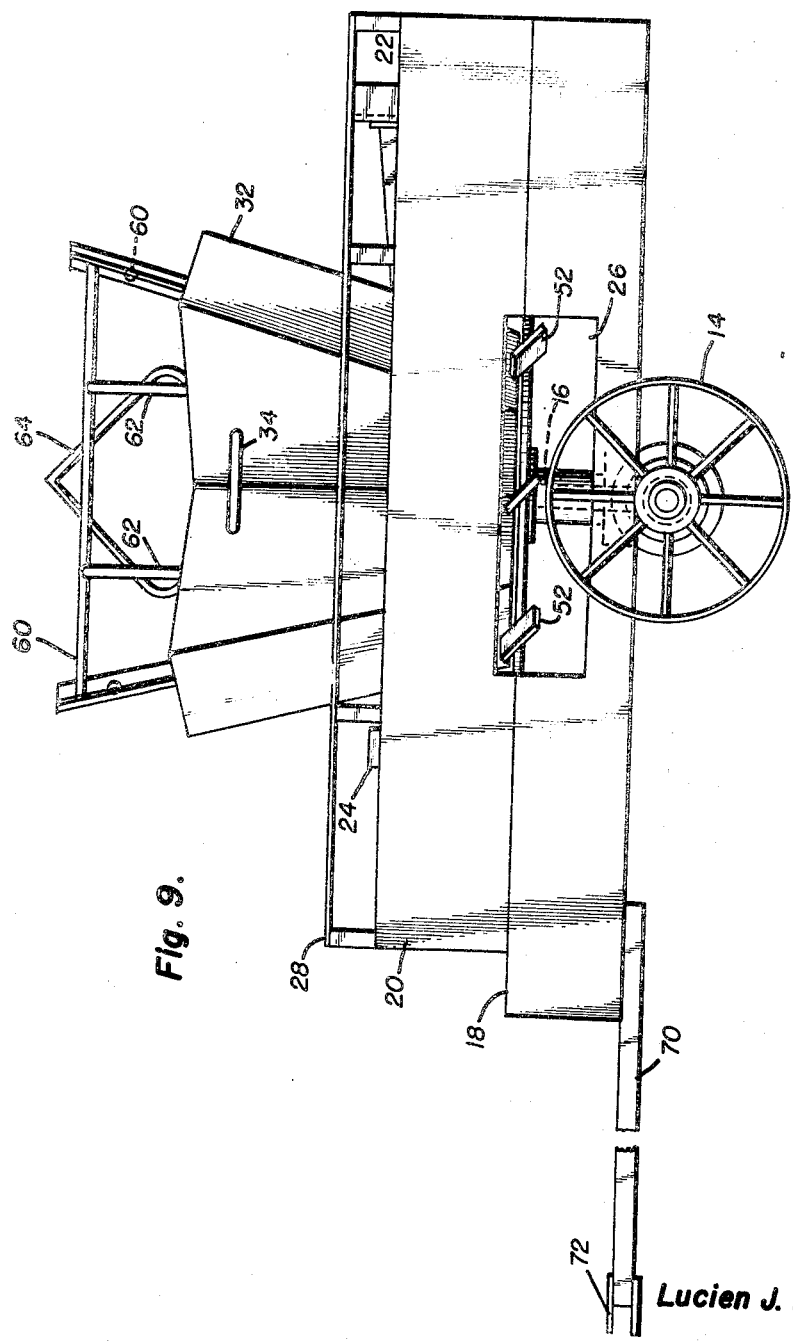
Figure 9 is an elevational side view of the assembled preferred embodiment of the instant invention.

Referring now to Figures 2, 3 and 9 particularly, an axle housing 10 having a differential 12 at the center thereof, is provided with wheels 14 at each end thereof. A stub shaft 16 is suitably secured to and operatively driven by the said differential 12. It is here noted that upon rotation of the said wheels 14, the shaft 16 is thereby rotated.

A pair of longitudinally extending beams 18 is secured to the said housing 10 at about their center and by some suitable conventional (unshown) means. A pair of platform members 20, adapted to rest upon the said beam 18, is provided and suitable tie rods 22 and 24 are secured adjacent the ends thereof to aid in forming a substantial trailer platform. As seen in Figure 9 an aperture 26 is provided in the sides of said trailer. A floor 28 is rested upon and secured to the said platform members 20, 22 and 24.

A suitable aperture 30 is provided in the floor 28 and a hopper 32, preferably hexagonal as shown, is received in the said aperture. A pair of handles 34 is provided on the said hopper in a suitable place for facility of handling thereof.

A pair of angle iron braces 36, having tie plates 38 and 40 at the ends thereof, is secured to the said hopper 32 by some suitable means such as welding or the like. It is noted that this invention contemplates the use of the said members 36 as simple bearing surfaces for the said hopper 32, having no securing means therebetween. Secured to the said platform members 22 and 24, are a plurality of channels 42 having slots 44 at the ends thereof. Suitable bolts 46 are received in appropriate apertures 48 in the said side members 38 and the said bolts are slidably and adjustably received in the slots 44. The function and operation of this portion of the invention is believed quite apparent. Vertical adjustment of the hopper 32 is obtained by simply adjusting the height of the frame members 36 through the medium of the said bolts 46 and members 42.

Figure 6:
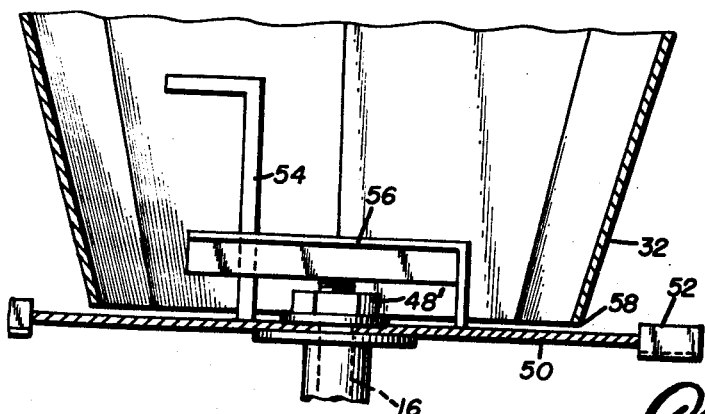
Figure 6 is an enlarged fragmentary sectional view showing certain details of construction.

Secured to the end of the said shaft 16 by some suitable means such as the nut 48', is a rotor or disc 50 which is disposed adjacent the outlet of the said hopper 32 (see Figure 6). A plurality of paddles or blades 52 are provided about the periphery of the said disc 50 for the purpose to be hereinafter described. A right angular rod 54 is secured to one face of the said disc and within the said hopper 32. The purpose of the rod 54 is to break up any lumps of fertilizer which might be used in conjunction with the instant invention.

A second blade like paddle or ejector 56 is disposed on the said disc 50 for the purpose of urging fertilizer between the bottom of the hopper 32 and the upper face of the said disc 50. Obviously, upon adjustment of the said hopper, as described hereinbefore, the aperture 58 may be regulated in accordance with the amount and the density of the fertilizer desired to be spread. After the fertilizer is urged through the said aperture 58 the paddles or blades 52 scatter the same upon contact therewith.

Figure 7:
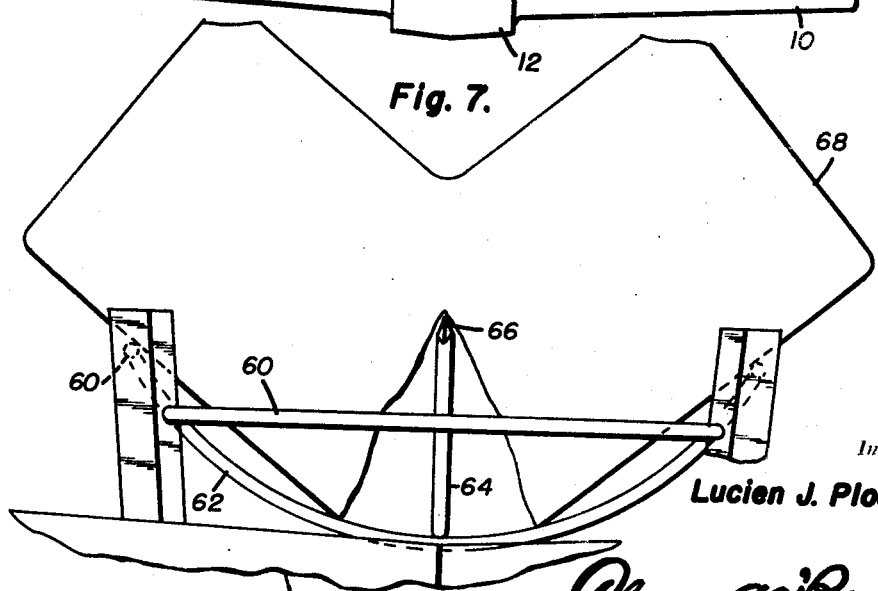
Figure 7 is a detailed view similar to the showing of Figure 5 and showing the operation thereof.
Figure 4:
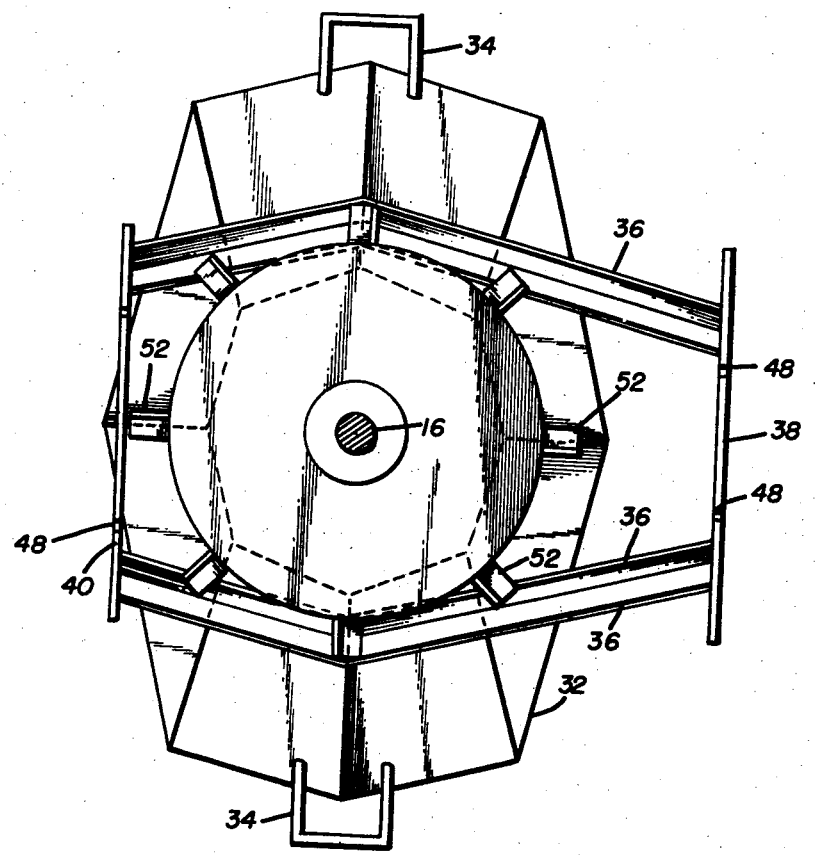
Figure 4 is a bottom plan view of the instant invention, showing particularly the hopper and clamping means therefor and having parts not shown for clarity.

Secured to the top or inlet portion of the said hopper 32 is a generally rectangular frame structure 60 having a pair of arcuate tie rods 62 secured thereacross. A substantially triangular cutter 64 having a knife edge 66 at the apex thereof, is suitably secured to the said arcuate tie rods 62 by suitable means such as welding and the like. The operation of this portion of the invention is apparent from an inspection of Figure 7. The sack of lime or the like is simply thrown in the hopper 32, landing on the said knife edge 66 and splitting. The contents of the bag 68 are then emptied into the hopper and the empty receptacle is stored on the floor 28.

In operation the quantity of lime per unit area is regulated by the proper adjustment of the hopper 32 with respect to the disc 50, as described hereinabove. Obviously, with a larger aperture 58 more lime is ejected than if a smaller aperture 58 is used. The speed of the rotor 50 is directly proportional to the angular velocity of the said wheel 14. Accordingly, the ejection of lime is regulated by the speed of the vehicle.

In securing the trailer to a prime mover, a beam 70 may be secured to the front end thereof and an appropriate conventional latching means 72 may be fixed to the end of the said beam 70. This construction is preferable since most tractors are provided with hooks at the back thereof, which may be connected very satisfactorily to the clamping means 72.

When the trailer is desired to be used as a cart or wagon the hopper 32 may simply be taken out of the frame member 36 or if the welded construction is used, all that is necessary is the removal of the bolt 46 and subsequently the removal of the hopper 32. Any kind of suitable cover may be used over the aperture 30.

While there has been described but a single preferred embodiment of the instant invention, it is understood that various changes including omissions and additions may be made herein without departing from the spirit of the invention. Accordingly, limitation is sought only in accordance with the scope of the accompanying claims.

Having thus described the instant invention, what is claimed as novel is as follows:

1. A fertilizer distributor comprising a carriage adapted to be secured to a prime mover, an aperture in the floor of said carriage, a hopper adjustably mounted on said carriage and having a lower outlet end projecting through said aperture, a rotatable disc secured below the outlet of said hopper, means for selectively lowering and raising said hopper and locking the same in adjusted positions whereby the vertical distance between said lower end of the hopper and said disc may be selectively varied, and means for rotating said disc including a differential driven by the wheels of said carriage, means for automatically opening bags of fertilizer thrown into the hopper including a frame work mounted transversely at the upper open end of the hopper and a piercing member vertically carried by said frame work, and means on said disc and rotatably extending into the hopper for pulverizing lumps of the fertilizer.

2. In a fertilizer distributor, the combination of a wheeled support with a floor having an opening therein, vertical supporting standards on said support, a hopper having an upper open end and a reduced lower open end, means vertically adjustably mounting said hopper on said standards, the open lower end of said hopper projecting through said opening in said support, a differential operatively secured to the wheels of said support, a rotatable disk driven by said differential and mounted beneath said opening and the open lower end of said hopper whereby the variable vertical space between the lower open end of said hopper and said disk constitutes an outlet of variable size for the fertilizer in the hopper, and means on said disk for directing fertilizer issuing from the hopper in predetermined quantities.

3. In a fertilizer distributor, the combination of a wheeled trailer adapted to be drawn by a prime mover and having a floor with an opening therein, slotted vertically disposed standards carried by said trailer, a hopper, means disposed in the slots of said standards for releasably holding said hopper in selected vertically adjusted positions on said standards, the lower end of said hopper projecting through said opening in the floor of said trailer, a differential operatively secured to the wheels of said trailer, a disk driven by said differential and mounted for rotation adjacent the lower end of said hopper and below said opening whereby the variable vertical space between the lower end of said hopper and said disk constitutes an outlet for the fertilizer in the hopper, a horizontally disposed arm on the upper surface of said disk for directing fertilizer issuing from the hopper in predetermined quantities, and a vertical agitator disposed on said disk and rotatably disposed in said hopper for urging fertilizer from said hopper and through the space between the lower end of said hopper and said disk.

4. In a fertilizer distributor, the combination of a wheeled support with a floor having an opening therein, supporting members carried by said support, a hopper carried by said members and having its lower open end disposed in the opening in the floor of said support, means for fixing said hopper in vertically adjusted positions, a differential operatively connected with the wheels of said support, a disk driven by said differential and mounted below said opening and the lower open end of said hopper whereby the variable vertical space between the lower open end of the hopper and said disk constitutes an outlet for the fertilizer in the hopper, a plurality of blades disposed on the periphery of said disk for directing fertilizer issuing from the hopper in predetermined quantities, a horizontally disposed dispensing member on said disk for urging fertilizer from said hopper onto the upper face of said disk, a vertical agitating element disposed within said hopper and operatively connected with said disk for breaking lumps of fertilizer prior to discharging thereof, and means disposed across the upper end of said hopper for rupturing and holding bags of fertilizer upon loading of said hopper.

5. In a fertilizer distributor, the combination of a wheeled trailer adapted to be drawn by a prime mover and having a floor with an opening therein, a hopper having an upper open end and a reduced outlet lower end, said hopper being vertically adjustably secured in and projecting through the opening in the floor of said trailer, means for holding said hopper in vertically adjusted positions, a disk mounted below said opening and said reduced outlet of said hopper, means for rotating said disk, whereby the variable vertical space between the lower end of said hopper and said disk constitutes an outlet for the fertilizer in said hopper, blades circumferentially spaced on said disk for distributing the fertilizer issuing from the lower end of said hopper in predetermined quantities, and means on said disk for urging fertilizer from said hopper comprising an angular horizontal baffle and an agitator vertically carried by said disk and operatively extending into said hopper.

LUCIEN J. PLOUFFE.

REFERENCES CITED

The following references are of record in the file of this patent:

UNITED STATES PATENTS

| Number | Name | Date |
|---|---|---|
| 1,096,011 | Beckwith et al. | May 12, 1914 |
| 1,682,825 | Bergeriou | Sept. 4, 1928 |
| 1,869,120 | Thoeming et al. | July 26, 1932 |
| 1,885,978 | Bobrick | Nov. 1, 1932 |
| 2,173,573 | Bascom | Sept. 19, 1939 |
| 2,244,414 | Arndt | June 3, 1941 |
| 2,418,271 | Meincke | Apr. 1, 1947 |